(12) United States Patent
Wang et al.

(10) Patent No.: US 12,140,999 B2
(45) Date of Patent: Nov. 12, 2024

(54) DISPLAY PANEL AND DISPLAY DEVICE

(71) Applicant: BOE Technology Group Co., Ltd., Beijing (CN)

(72) Inventors: Deshuai Wang, Beijing (CN); Jian Sun, Beijing (CN); Zhen Wang, Beijing (CN); Yue Shan, Beijing (CN); Wei Yan, Beijing (CN); Jian Zhang, Beijing (CN); Han Zhang, Beijing (CN); Wenwen Qin, Beijing (CN); Yadong Zhang, Beijing (CN); Xiaoyan Yang, Beijing (CN); Keyan Liu, Beijing (CN); Hong Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/925,658

(22) PCT Filed: Dec. 20, 2021

(86) PCT No.: PCT/CN2021/139472
§ 371 (c)(1),
(2) Date: Nov. 16, 2022

(87) PCT Pub. No.: WO2023/115239
PCT Pub. Date: Jun. 29, 2023

(65) Prior Publication Data
US 2024/0241542 A1    Jul. 18, 2024

(51) Int. Cl.
*G06F 1/16*    (2006.01)

(52) U.S. Cl.
CPC .......... *G06F 1/1643* (2013.01); *G06F 1/1639* (2013.01); *G06F 1/1658* (2013.01)

(58) Field of Classification Search
CPC ..... G06F 1/1643; G06F 1/1639; G06F 1/1658
See application file for complete search history.

(56) References Cited

U.S. PATENT DOCUMENTS

| 9,711,541 B2 | 7/2017 | Sun et al. |
| 10,394,374 B2 | 8/2019 | Zeng et al. |
| (Continued) | | |

FOREIGN PATENT DOCUMENTS

| CN | 101996556 A | 3/2011 |
| CN | 104699349 A | 6/2015 |
| (Continued) | | |

*Primary Examiner* — Lisa S Landis
(74) *Attorney, Agent, or Firm* — WHDA, LLP

(57) ABSTRACT

A display panel includes: a base substrate including a display region and a fan-out region, and the fan-out region is located between the display region and a chip; a plurality of data wires/touch wires located in the fan-out region for respectively electrically connecting a plurality of data lines/touch signal lines with the chip. A portion of the plurality of data wires is located in a first conductive layer while a rest portion thereof is located in the second conductive layer. A portion of the plurality of touch wires is located in at least one of the first conductive layer and the second conductive layer while a rest portion thereof is located in the third conductive layer. A pitch between any two adjacent wires in the first/second/third conductive layer is a first/second/third wire pitch, respectively. The first wire pitch and the second wire pitch are smaller than the third wire pitch.

16 Claims, 10 Drawing Sheets

(56) References Cited

U.S. PATENT DOCUMENTS

| | | | |
|---|---|---|---|
| 2016/0293631 A1 | 10/2016 | Sun et al. | |
| 2018/0059862 A1 | 3/2018 | Zeng et al. | |
| 2021/0124206 A1 | 4/2021 | Li et al. | |
| 2022/0357809 A1* | 11/2022 | Lee | H05K 1/115 |

FOREIGN PATENT DOCUMENTS

| | | |
|---|---|---|
| CN | 104932161 A | 9/2015 |
| CN | 106444182 A | 2/2017 |
| CN | 106951125 A | 7/2017 |
| CN | 107037646 A | 8/2017 |
| CN | 108806513 A | 11/2018 |
| CN | 109491121 A | 3/2019 |
| CN | 107121860 B | 5/2020 |
| CN | 113157129 A | 7/2021 |
| EP | 3846010 A1 | 7/2021 |
| IN | 108732837 A | 11/2018 |
| JP | 2017-199138 A | 11/2017 |
| JP | 2020-052552 A | 4/2020 |

\* cited by examiner

DISPLAY PANEL AND DISPLAY DEVICE

CROSS REFERENCE

This application is a Section 371 National Stage Application of International Application No. PCT/CN2021/139472, filed on Dec. 20, 2021, entitled "DISPLAY PANEL AND DISPLAY DEVICE", the whole disclosure of which is incorporated herein by reference in its entirety.

TECHNICAL FIELD

Embodiments of the present disclosure relate to a field of display technology, and in particular to a display panel and a display device.

BACKGROUND

With the development of display technologies, a full screen has gradually become one of trends of display devices. A design of a full screen is to pursue a narrow frame or frameless design for each frame position, and to pursue a screen ratio close to 100%. A lower frame of a display panel is mainly limited by a height of a wire in a fan-out region, and the height of the wire in the fan-out region is mainly limited by a number of wiring layers, a quantity of wirings, and a pitch of wirings. In the related art, the height of the wire in the fan-out region is relatively high, resulting in that the lower frame of the display panel may not be further miniaturized.

The above information disclosed in the present section is only for understanding of the background of the technical concept of the present disclosure. Therefore, the above information may contain information that does not constitute the prior art.

SUMMARY

In an aspect, a display panel is provided, including: a base substrate including a display region and a first side region, wherein the first side region is located on a first side of the display region, and the first side region includes a fan-out region; a plurality of pixel units, wherein at least some of the plurality of pixel units are arranged in the display region of the base substrate in an array along a first direction and a second direction intersecting the first direction; a plurality of touch units, wherein at least some of the plurality of touch units are arranged in the display region of the base substrate in an array along the first direction and the second direction; a plurality of data lines, wherein at least a portion of the data lines is located in the display region, and the plurality of data lines are respectively electrically connected with the plurality of pixel units for providing a data signal to each pixel unit; a plurality of touch signal lines, wherein at least a portion of the touch signal lines is located in the display region, the plurality of touch signal lines are respectively electrically connected with the plurality of touch units for providing a touch signal to each touch unit; a chip located in the first side region, wherein the fan-out region is located between the display region and the chip; a plurality of data wires located in the fan-out region, wherein the plurality of data wires electrically connect the plurality of data lines with the chip, respectively; a plurality of touch wires located in the fan-out region, wherein the plurality of touch wires electrically connect the plurality of touch signal lines with the chip, respectively, wherein the display panel includes a first conductive layer, a second conductive layer and a third conductive layer arranged on the base substrate, wherein a portion of the plurality of data wires is located in the first conductive layer, and a rest portion of the plurality of data wires is located in the second conductive layer, a portion of the plurality of touch wires is located in at least one of the first conductive layer and the second conductive layer, and a rest portion of the plurality of touch wires is located in the third conductive layer, and wherein a pitch between any two adjacent wires in the first conductive layer is a first wire pitch, a pitch between any two adjacent wires in the second conductive layer is a second wire pitch, a pitch between any two adjacent wires in the third conductive layer is a third wire pitch, and any one of the first wire pitch and the second wire pitch is smaller than the third wire pitch.

According to some exemplary embodiments, in the fan-out region, a space occupied by a first wire spacing between the wires in the first conductive layer has a first width, a space occupied by a second wire spacing between the wires in the second conductive layer has a second width, and a space occupied by a third wire spacing between the wires in the third conductive layer has a third width; and wherein a ratio between any two of the first width, the second width and the third width is between 0.95 and 1.05.

According to some exemplary embodiments, a quantity of the plurality of data wires is m, and a quantity of the plurality of touch wires is n; m1 data wires and n1 touch wires are provided in the first conductive layer of the fan-out region; m2 data wires and n2 touch wires are provided in the second conductive layer of the fan-out region; and n3 touch wires are provided in the third conductive layer of the fan-out region, and wherein m=m1+m2, n=n1+n2+n3; and m1+n1=m2+n2, wherein m, n, m1, m2, and n3 are all positive integers greater than or equal to 2, n1 and n2 are integers greater than or equal to 0, and n1 and n2 are not 0 at the same time.

According to some exemplary embodiments. (m1+n1)×pt1=(m2+n2)×pt2, wherein pt1 represents the first wire pitch, and pt2 represents the second wire pitch.

According to some exemplary embodiments, $$pr = \frac{(m1 + n1) \times pt1}{(n3 \times pt3)},$$

pr represents a ratio of the first width to the third width, and pr is between 0.95 and 1.05.

According to some exemplary embodiments, the pixel unit includes a pixel driving circuit, the pixel driving circuit includes a thin film transistor, the thin film transistor includes an active layer, a gate, a source and a drain, the gate is located in the third conductive layer, and the source and the drain are located in the first conductive layer.

According to some exemplary embodiments, the touch unit includes a touch electrode, and the touch electrode is located in the second conductive layer.

According to some exemplary embodiments, the display panel includes a light shielding portion located between the base substrate and the active layer, and an orthographic projection of the light shielding portion on the base substrate at least partially overlaps with an orthographic projection of the active layer on the base substrate; and wherein the light shielding portion is located in the second conductive layer.

According to some exemplary embodiments, a portion of the plurality of touch wires located at edges of two sides of the fan-out region is located in at least one of the first conductive layer and the second conductive layer; or for the plurality of touch wires, touch wires located at odd positions are located in at least one of the first conductive layer and the second conductive layer, or touch wires located at even positions are located in at least one of the first conductive layer and the second conductive layer.

According to some exemplary embodiments, m1 data wires are located in the first conductive layer, m2 data wires are located in the second conductive layer, n1 touch wires are located in the first conductive layer, and n2=0, wherein data lines electrically connected with the m1 data wires and touch signal lines electrically connected with the n1 touch wires are all located at odd positions; and wherein data lines electrically connected with the m2 data wires are located at even positions.

According to some exemplary embodiments, m1 data wires are located in the first conductive layer, m2 data wires are located in the second conductive layer, n2 touch wires are located in the second conductive layer, and n1=0, wherein data lines electrically connected with the m1 data wires are located at odd positions, and touch signal lines electrically connected with the n2 touch wires are located at even positions; and wherein data lines electrically connected with the m2 data wires are located at even positions.

According to some exemplary embodiments, m1 data wires are located in the first conductive layer, m2 data wires are located in the second conductive layer, n1 touch wires are located in the second conductive layer, n2 touch wires are located in the second conductive layer, and n1 and n2 are both positive integers, and wherein data lines electrically connected with the m1 data wires are located at odd positions, touch signal lines electrically connected with the n1 touch wires are located at odd positions, data lines electrically connected with the m2 data wires are located at even positions, touch signal lines electrically connected with the n2 touch wires are located at even positions; or data lines electrically connected with the m1 data wires are located at even positions, touch signal lines electrically connected with the n1 touch wires are located at even positions, data lines electrically connected with the m2 data wires are located at odd positions, and touch signal lines electrically connected with the n2 touch wires are located at odd positions.

According to some exemplary embodiments, the plurality of data wires or the plurality of touch wires include a first wire located at a side edge of the fan-out region a second wire located at a middle position of the fan-out region, the first wire includes an inclined portion and a vertical portion, the vertical portion extends parallel to the second direction, the inclined portion extends obliquely relative to the second direction, and the second wire only includes a vertical portion, and wherein a ratio of the vertical portion of the second wire to the vertical portion of the first wire is greater than 2.

According to some exemplary embodiments, the display panel further includes a plurality of jumpers, the fan-out region includes a jumper region, the jumper region is located between the plurality of data wires as well as the plurality of touch wires and the chip, and the plurality of jumpers are configured to electrically connect the plurality of data wires as well as the plurality of touch wires with the chip, and wherein the jumper region is located between the vertical portion and the chip, so that a length of the vertical portion of the second wire is less than 1 mm.

According to some exemplary embodiments, at least some of orthographic projections of the wires located in the first conductive layer on the base substrate, orthographic projections of the wires located in the second conductive layer on the base substrate, and orthographic projections of the wires located in the third conductive layer on the base substrate are arranged apart.

In another aspect, a display device is provided, including the display panel described above.

BRIEF DESCRIPTION OF THE DRAWINGS

Features and advantages of the present disclosure will become more apparent by describing exemplary embodiments of the present disclosure in detail with reference to the accompanying drawings.

DETAILED DESCRIPTION OF EMBODIMENTS

Figure 1:
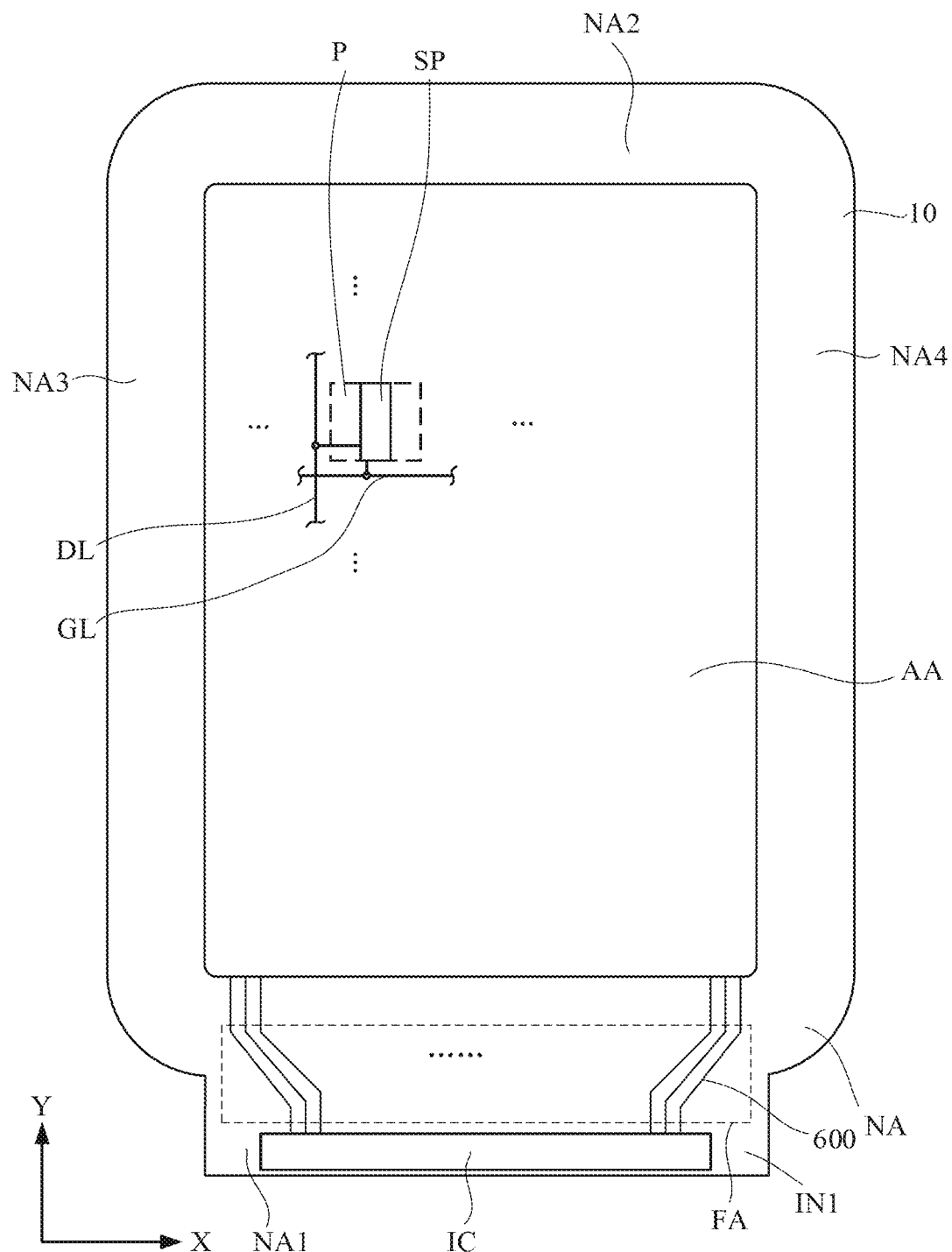
FIG. 1 is a schematic plan view of a display panel according to the embodiments of the present disclosure, in which a pixel unit, a data line, and a data wire are schematically shown.

In order to make objectives, technical solutions and advantages of the present disclosure clearer, the technical solutions of embodiments of the present disclosure will be clearly and completely described below with reference to the drawings. Obviously, the described embodiments are only some, rather than all embodiments of the present disclosure. Based on the described embodiments of the present disclosure, all additional embodiments obtained by those ordinary skilled in the art without carrying out inventive effort fall within the scope of protection of the present disclosure.

It should be noted that, in the drawings, for clarity and/or description purposes, sizes and relative sizes of elements may be enlarged. Accordingly, the size and the relative size of each element need not to be limited to those shown in the drawings. In the specification and drawings, the same or similar reference numerals indicate the same or similar components.

When an element is described as being "on", "connected to" or "coupled to" another element, the element may be directly on the another element, directly connected to the another element, or directly coupled to the another element, or an intermediate element may be present. However, when an element is described as being "directly on", "directly connected to" or "directly coupled to" another element, no intermediate element is present. Other terms and/or expressions used to describe a relationship between elements, such as "between" and "directly between", "adjacent" and "directly adjacent", "on" and "directly on", and so on, should be interpreted in a similar manner. In addition, the term "connection" may refer to a physical connection, an electrical connection, a communication connection, and/or a fluid connection. In addition, X-axis, Y-axis and Z-axis are not limited to three axes of a rectangular coordinate system, and may be interpreted in a broader meaning. For example, the X-axis, the Y-axis and the Z-axis may be perpendicular to each other, or may represent different directions that are not perpendicular to each other. For the objective of the present disclosure, "at least one of X, Y and Z" and "at least one selected from a group consisting of X, Y and Z" may be interpreted as only X, only Y, only Z, or any combination of two or more of X, Y and Z, such as XYZ, XYY, YZ and ZZ. As used herein, the term "and/or" includes any and all combinations of one or more of listed related items.

It should be noted that although the terms "first", "second", and so on may be used herein to describe various components, members, elements, regions, layers and/or parts, these components, members, elements, regions, layers and/or parts should not be limited by these terms. Rather, these terms are used to distinguish one component, member, element, region, layer and/or part from another. Thus, for example, a first component, a first member, a first element, a first region, a first layer and/or a first part discussed below may be referred to as a second component, a second member, a second element, a second region, a second layer and/or a second part without departing from teachings of the present disclosure.

For ease of description, spatial relationship terms, such as "upper", "lower", "left", "right", "middle", "two side", "inner", "outer" and the like may be used herein to describe a relationship between one element or feature and another element or feature as shown in the drawing. It should be understood that the spatial relationship terms are intended to cover other different orientations of a device in use or operation in addition to an orientation described in the drawing. For example, if the device in the drawing is turned upside down, an element or feature described as "below" or "under" another element or feature will be oriented "above" or "on" the another element or feature.

Those skilled in the art should understand that herein, unless otherwise specified, the expression "height" or "thickness" refers to a dimension of a surface of each film layer provided in a direction perpendicular to the display panel. i.e., a dimension along a light exit direction of the display panel, or a dimension along a normal direction of the display device.

In the present disclosure, unless otherwise specified, the expression "patterning process" generally includes steps of photoresist coating, exposure, development, etching, and photoresist stripping. The expression "one-time patterning process" means a process of forming patterned layers, components, members and so on by using one mask.

It should be noted that the expressions "the same layer", "arrangement in the same layer" or similar expressions refer to a layer structure formed by firstly using the same film forming process to form a film layer for forming a specific pattern, and then using the same mask to pattern the film layer by using a one-time patterning process. Depending on different specific patterns, the one-time patterning process may include multiple exposure, development or etching processes, and the specific pattern in the formed layer structure may be continuous or discontinuous. These specific patterns may also be located at different heights or have different thicknesses.

In the present disclosure, unless otherwise specified, the terms "connected" and "connecting" should be understood in a broad sense. For example, it may be a fixed connection, a detachable connection, or an integrated connection; it may be a mechanical connection or an electrical connection; it may be a direct connection, an indirect connection through a middleware, a connection inside two components, or an integral formation of two components. Those of ordinary skill in the art may understand the specific meaning of the above terms in the present disclosure according to the actual situations.

According to the present disclosure, there is provided a display panel, including: a base substrate, the base substrate including a display region and a first side region, the first side region being located on a first side of the display region, and the first side region including a fan-out region; a plurality of pixel units, at least some of the plurality of pixel units being arranged in the display region of the base substrate in an array along a first direction and a second direction; a plurality of touch units, at least some of the plurality of touch units being arranged in the display region of the base substrate in an array along the first direction and the second direction; a plurality of data lines, at least some of the data lines being located in the display region, the plurality of data lines being respectively electrically connected with the plurality of pixel units for providing a data signal to each pixel unit; a plurality of touch signal lines, at least some of the touch signal lines being located in the display region, the plurality of touch signal lines being respectively electrically connected with the plurality of touch units for providing a touch signal to each touch unit; a chip, the chip being located in the first side region, and the fan-out region being located between the display region and the chip; a plurality of data wires, the plurality of data wires being located in the fan-out region, and the plurality of data wires respectively electrically connecting the plurality of data lines with the chip; and a plurality of touch wires, the plurality of touch wires being located in the fan-out region, and the plurality of touch wires respectively electrically connecting the plurality of touch signal lines with the chip. The display panel includes a first conductive layer, a second conductive layer and a third conductive layer arranged on the base substrate, a portion of the plurality of data wires are located in the first conductive layer, and a rest portion of the plurality of data wires are located in the second conductive layer, a portion of the plurality of touch wires are located in at least one of the first conductive layer and the second conductive layer, and a rest portion of the plurality of touch wires are located in the third conductive layer, a pitch between any two adjacent wires in the first conductive layer is a first wire pitch, and a pitch between any two adjacent wires in the second conductive layer is a second wire pitch, a pitch between any two adjacent wires in the third conductive layer is a third wire pitch, and any one of the first wire pitch and the second wire pitch is smaller than the third wire pitch. In the embodiments of the present disclosure, in the fan-out region, more wires are arranged in two conductive layers having smaller wire pitches, and fewer wires are arranged in the conductive layer having a larger wire pitch. By evenly arranging the wires in the three conductive layers, a height of the fan-out region may be reduced, and therefore a frame dimension of the display panel may be reduced, which is beneficial to achieve a display panel and a display device having a narrow frame.

Figure 2:
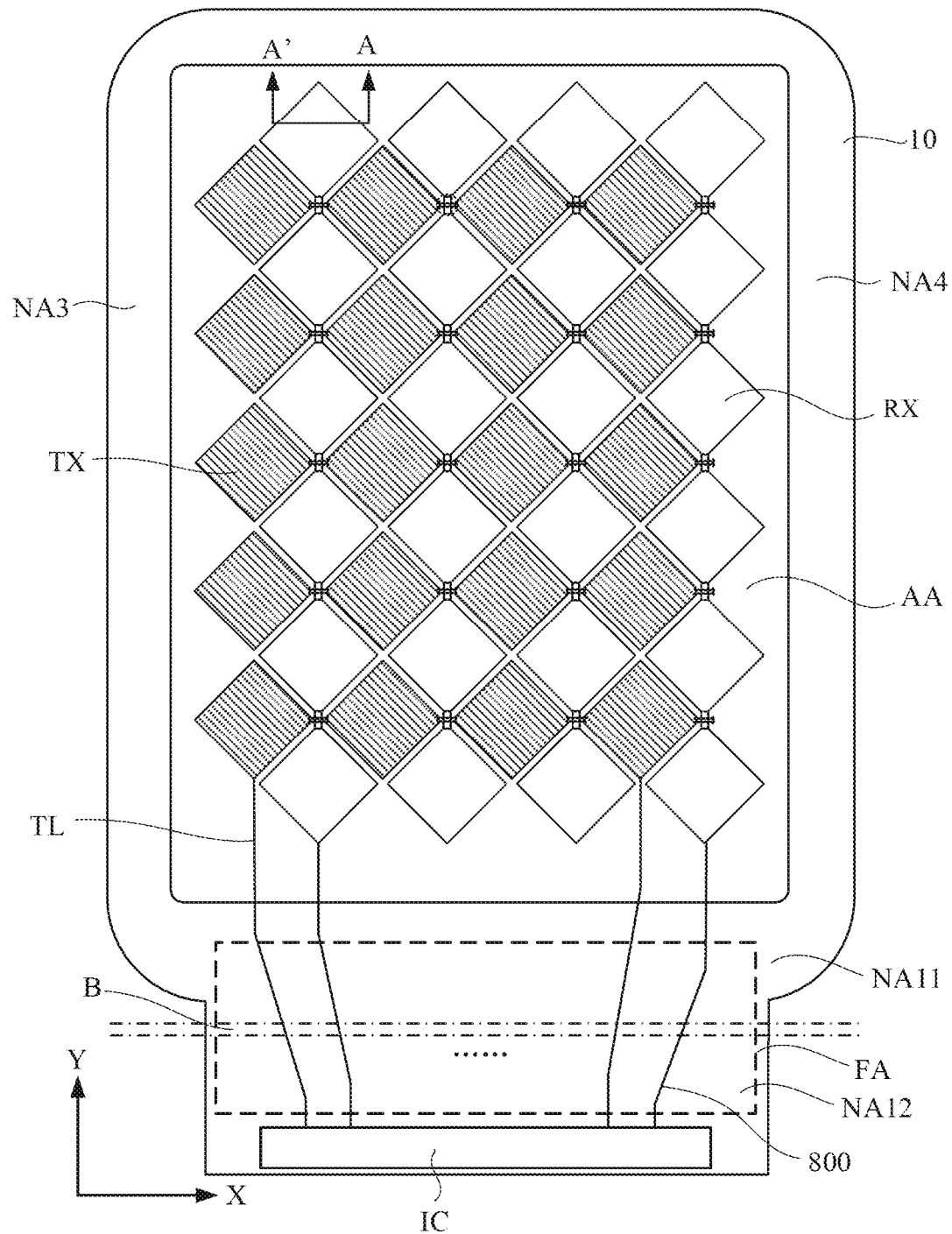
FIG. 2 is a schematic plan view of a display panel according to some exemplary embodiments of the present disclosure, in which a touch unit, a touch signal line and a touch wire are schematically shown.
Figure 3:
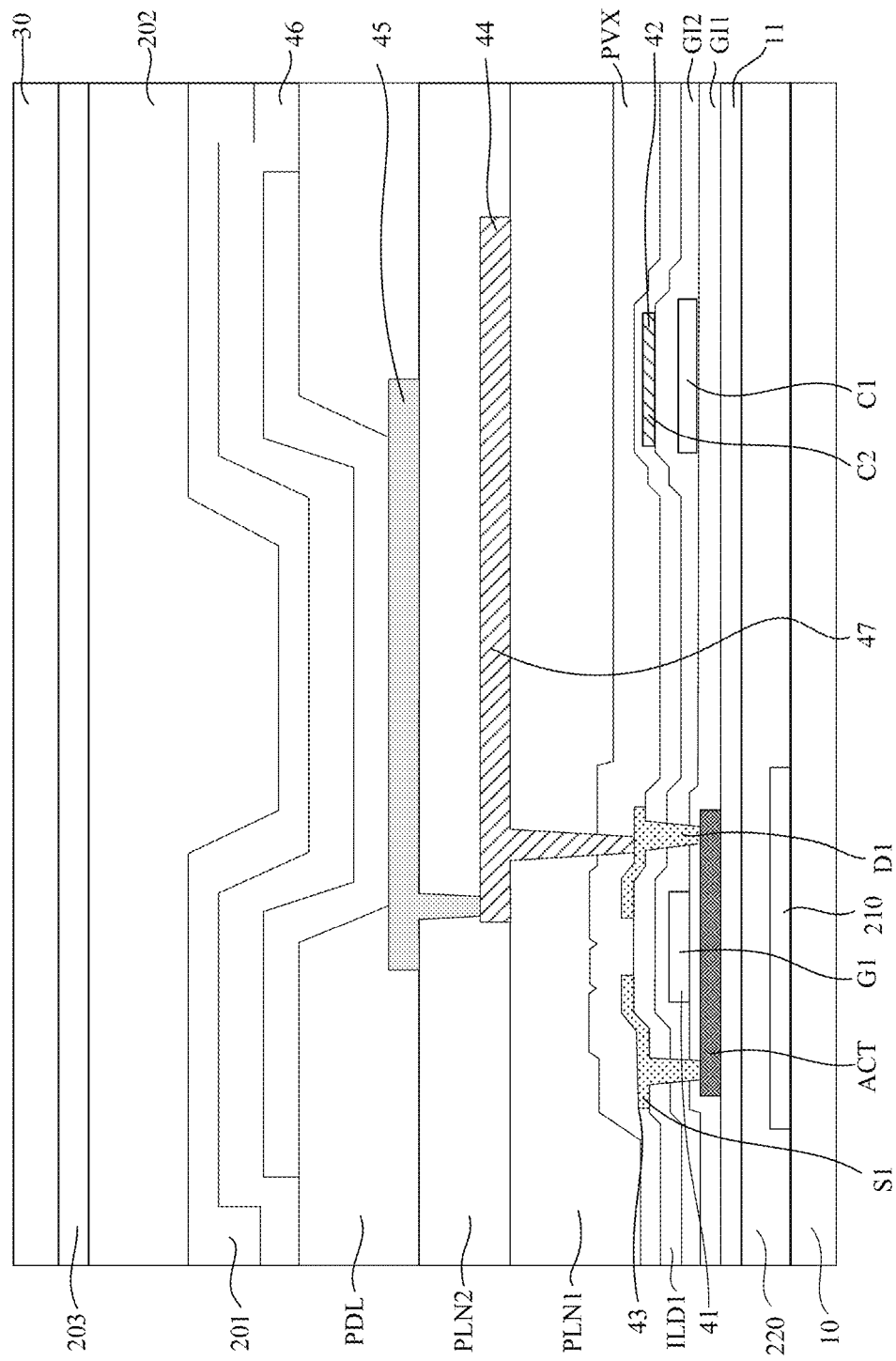
FIG. 3 is a schematic cross-sectional view of a display panel according to the embodiments of the present disclosure taken along a line AA' in FIG. 2.

FIG. 1 is a schematic plan view of a display panel according to the embodiments of the present disclosure, in which a pixel unit, a data line, and a data wire are schematically shown. FIG. 2 is a schematic plan view of a display panel according to some exemplary embodiments of the present disclosure, in which a touch unit, a touch signal line and a touch wire are schematically shown. FIG. 3 is a schematic cross-sectional view of a display panel according to the embodiments of the present disclosure taken along a line AA' in FIG. 2.

Referring to FIG. 1, the display panel according to the embodiments of the present disclosure may include a base substrate 10. For example, the base substrate 10 may be formed of a material such as glass, plastic, polyimide or the like. The base substrate 10 includes a display region AA and a peripheral region (which may also be referred to as a non-display region) NA located on at least one side of the display region AA.

The display panel may include a plurality of pixel units P (schematically shown in a dashed box in FIG. 1) arranged in the display region AA, and the plurality of pixel units P may be arranged in an array on the base substrate 10 along a first direction X and a second direction Y. Each pixel unit P may further include a plurality of subpixels, such as a red subpixel, a green subpixel, and a blue subpixel. In FIG. 1, one subpixel SP is schematically shown.

For example, the first direction X may intersect the second direction Y, for example, the two may be perpendicular to each other.

For example, the display panel includes a signal input side IN1 (a lower side shown in FIG. 1), and a data driving chip IC may be provided on the signal input side IN1. The data driving chip IC may be electrically connected to the pixel units P located in the display region through a plurality of signal wires, and pixel driving circuits may be electrically connected to the data driving chip IC. In this way, signals such as data signals, scan signals and touch signals may be transmitted to the plurality of pixel units P from the signal input side IN1.

For example, as shown in FIG. 1, the peripheral region NA may be located on four sides of the display region AA, i.e., the peripheral region surrounds the display region AA.

It should be noted that in the drawings, the pixel units and the subpixels are schematically shown in a rectangular shape, but this does not limit the shapes of the pixel units and the subpixels included in the display panel provided according to the embodiments of the present disclosure.

In the embodiments of the present disclosure, each pixel unit P may include a pixel driving circuit and a light emitting device electrically connected with the pixel driving circuit. For example, the light emitting device may be an organic light emitting diode (OLED), a quantum dot light emitting diode (QLED), or the like. The light emitting device may include a first electrode, a second electrode, and a light emitting layer arranged between the first electrode and the second electrode.

One of the first electrode and the second electrode is an anode and the other one of the first electrode and the second electrode is a cathode. For example, the first electrode may be the anode, and the second electrode may be the cathode. The light emitting layer may be a multi-layer structure. For example, the light emitting layer may include a multi-layer structure formed by a hole injection layer, a hole transport layer, an organic light emitting layer, an electron transport layer, and an electron injection layer.

It should be noted that the light emitting device such as the organic light emitting diode may be driven actively or passively. A passively driven OLED array substrate is constituted by a cathode and an anode, an intersecting portion of the anode and the cathode may emit light, and the driving circuit may be externally mounted by a connection manner such as a tape carrier packaging, a glass carrier chip or the like. In an actively driven OLED array substrate, each pixel may be provided with a pixel driving circuit, and the pixel driving circuit may include a thin film transistor having a switching function (i.e., a switching transistor), a thin film transistor having a driving function (i.e., a driving transistor) and a charge storage capacitor. In addition, the pixel driving circuit may further include another type of thin film transistor having a compensation function. It should be understood that in the embodiments of the present disclosure, the display panel may be provided with various types of known pixel driving circuits, which will not be repeated here. For example, each pixel unit P may include a pixel driving circuit having a circuit structure such as 7T1C, 7T2C, 8T2C or 4T1C in the art. The pixel driving circuit operates under a control of data signals transmitted through data lines and gate scan signals as well as light emitting control signals transmitted through signal lines, so as to drive the light emitting device to emit light, thereby achieving operations such as display and the like.

For example, the display panel may include a driving circuit layer, and the above pixel driving circuit may be provided in the driving circuit layer. An insulating layer may be provided between the driving circuit layer and the light emitting device, and the insulating layer may be a single insulating film layer or a stack layer composed of a plurality of insulating film layers.

For example, the display panel may further include various signal lines arranged on the base substrate 10. The various signal lines include data lines, gate scan signal lines, light emitting control signal lines, first power supply wires, second power supply wires, etc., so as to provide various signals such as data signals, gate scan signals, light emitting control signals, a first power supply voltage, and a second power supply voltage to the pixel driving circuit in each subpixel. In the embodiment shown in FIG. 1, a scan line GL and a data line DL are schematically shown. The scan line GL and the data line DL may be electrically connected to each pixel unit P. For example, at least a portion of the data line DL is located in the display region AA, and the plurality of data lines DL are respectively electrically connected to the plurality of pixel units P for providing data signals to each pixel unit P.

Referring to FIG. 1 to FIG. 3 in combination, the display panel according to the embodiments of the present disclosure has a display region AA and a peripheral region NA surrounding the display region AA. The peripheral region NA includes a first side region NA1, a second side region NA2, a third side region NA3 and a fourth side region NA4. For example, the first side region NA1, the second side region NA2, the third side region NA3 and the fourth side region NA4 may be respectively considered as a lower frame, an upper frame, a left frame and a right frame of the display panel.

When viewed from a front side of the display panel, the display panel according to the embodiments of the present disclosure has a display region and a peripheral region. The display region of the display panel is provided with light emitting pixels which may display images. The peripheral region surrounds the display region. Typically, when viewed from the front side, the display region has side regions all around. However, for some display panels, a side region is desired to be as narrow as possible from an aesthetic point of view. Therefore, in an application such as a full-screen mobile phone, a side region may not be provided on the left, right and top of the display region. Nevertheless, a display panel still needs to have at least one side region for centralizedly accommodating necessary circuits that are difficult to be bent, and the side region is usually located below the display region. For example, even in the current full-screen mobile phone application, there is still a lower side region on a lower portion of the mobile phone where no image is displayed. It should be understood that expressions "upper", "lower", "left", "right"; "front" and "rear" herein are only used to describe relative positions among components rather than absolute positions. In the present disclosure, the lower frame is only used for ease of describing a relative position, but does not mean that it is necessarily positioned below a display image. Furthermore, although a conventional display panel is rectangular and the lower side region thereof is a rectangular region with one of four sides thereof, but a display panel of another outline shape may also have a side region of any shape where circuits are centralizedly accommodated. Any frame having a centralized circuit wiring in the display panel may be considered as a lower frame. Moreover, it is specified in the present disclosure that the lower frame is located at a lower side, and the display region is correspondingly located at an upper side.

In the embodiments of the present disclosure, at least a portion of the first side region NA1 may be bent to a non-display side of the display panel, thereby reducing an area of the non-display region on a display side of the display panel, and further achieving a large screen and narrow frame design of the display panel. For example, the first side region NA1 may include a first subside region NA11, a second subside region NA12 and a bending region B. The first subside region NA11 is located on a side of the second subside region NA12 close to the display region AA, and the bending region B is arranged between the first subside region NA11 and the second subside region NA12. The bending region B may be bent along a bending axis BX, so that the second subside region NA12 may be bent to the non-display side of the display panel. For example, structures such as a driving chip (IC) and a flexible circuit board (FPC) for controlling the display and touch of the display region AA may be provided in the second subside region NA12.

Referring to FIG. 1 to FIG. 3 in combination, the display panel may include a base substrate 10, a driving circuit layer, an encapsulation layer and a touch layer 30. The driving circuit layer, the encapsulation layer and the touch layer are arranged in sequence in a direction away from the base substrate 10.

For example, the touch layer may include an FMLOC film layer. With the development of technologies, the market has put forward higher and higher requirements for the thinning of display devices (such as a mobile phone). The Flexible Multi-Layer On Cell (FMLOC for short) technology has emerged as the times require. In the FMLOC process, a metal mesh electrode layer is manufactured on an encapsulation layer of a display module to achieve a touch function while no external touch structure is required, thereby an overall thickness of the display screen may be reduced.

In the embodiments of the present disclosure, the display panel may further include a plurality of touch units, and at least some of the plurality of touch units are arranged in the display region AA of the base substrate in an array along the first direction X and the second direction Y. For example, the touch layer 30 may include a first touch layer, a second touch layer, and a touch insulating layer arranged between the first touch layer and the second touch layer. For example, in the display region AA, the plurality of touch units may include first touch electrodes TX and second touch electrodes RX. For example, the first touch electrode TX may be a touch driving electrode TX, and the second touch electrode RX may be a touch sensing electrode RX. A plurality of first touch electrodes TX may be arranged along the first direction X, and a plurality of second touch electrodes RX may be arranged along the second direction intersecting with the first direction. In some embodiments, the first direction is perpendicular to the second direction. For example, as illustrated in FIG. 2, the first direction may be a width direction of the display panel, and the second direction may be a length direction of the display panel.

As an example, in the example of FIG. 2, shapes of the first touch electrodes TX and the second touch electrodes RX are rhombus. However, the embodiments of the present disclosure are not limited to this. Those skilled in the art should understand that in other embodiments, the shapes of the first touch electrodes TX and the second touch electrodes RX may be other shapes.

For example, the display panel may further include a plurality of touch signal lines TL. At least a portion of the touch signal lines TL are located in the display region AA, and the plurality of touch signal lines TL are respectively electrically connected to the plurality of touch units (the first touch electrodes TX and the second touch electrodes RX) for providing a touch signal to each touch unit.

Referring further to FIG. 1 and FIG. 2, the first side region NA1 may include a fan-out region FA of the display panel, and the fan-out region FA is located between the display region AA and the chip IC. It should be understood that a plurality of signal wires densely arranged are provided in the fan-out region FA to transmit a plurality of signals to each pixel unit and touch unit. In the fan-out region FA, each signal wiring is arranged in a fan-shaped wiring manner.

In the embodiments of the present disclosure, the display panel may include a plurality of data wires 600. The plurality of data wires 600 are located in the fan-out region FA, and the plurality of data wires 600 respectively electrically connect the plurality of data lines DL with the chip IC. In this way, the data signals provided by the chip IC may be provided to each pixel unit.

In the embodiments of the present disclosure, the display panel may include a plurality of touch wires 800. The plurality of touch wires 800 are located in the fan-out region FA, and the plurality of touch wires 800 respectively electrically connect the plurality of touch signal lines TL with the chip IC. In this way, the touch signals provided by the chip IC may be provided to each touch unit.

Referring to FIG. 1 to FIG. 3 in combination, in the display region AA, the display panel may include a base substrate 10, a buffer layer 11 arranged on the base substrate 10, a semiconductor layer ACT arranged on a side of the buffer layer 11 away from the base substrate 10, a first gate conductive layer 41 arranged on aside of the semiconductor layer ACT away from the base substrate 10, a second gate conductive layer 42 arranged on a side of the first gate conductive layer 41 away from the base substrate 10, a first source-drain conductive layer 43 arranged on a side of the second gate conductive layer 42 away from the base substrate 10, and a second source-drain conductive layer 44 arranged on a side of the first source-drain conductive layer 43 away from the base substrate 10. The display panel may also include a first insulating layer GI1 arranged between the semiconductor layer ACT and the first gate conductive layer 41, a second insulating layer GI2 arranged between the first gate conductive layer 41 and the second gate conductive layer 42, a third insulating layer ILD1 arranged between the second gate conductive layer 42 and the first source-drain conductive layer 43, and a fourth insulating layer arranged between the first source-drain conductive layer 43 and the second source-drain conductive layer 44. For example, the fourth insulating layer may include a passivation layer PVX and a first planarization layer PLN1. The passivation layer PVX may be arranged on a side of the third conductive layer 42 away from the base substrate 10, and the first planarization layer PLN1 may be arranged on a side of the passivation layer PVX away from the base substrate 10.

For example, the display panel may include a plurality of pixel units and pixel driving circuits for driving the plurality of pixel units. The pixel driving circuit may include a plurality of thin film transistors and storage capacitors. The thin film transistor may include an active layer, a gate, a source and a drain, and the storage capacitor may include a first electrode plate and a second electrode plate. In FIG. 3, one thin film transistor and one storage capacitor are schematically shown. For example, the active layer of the thin film transistor may be located in the semiconductor layer ACT, the gate G1 of the thin film transistor and the first electrode plate C1 of the storage capacitor may be located in the first gate conductive layer 41, the second electrode plate C2 of the storage capacitor may be located in the second gate conductive layer 42, and the source S1 and the drain D1 of the thin film transistor may be located in the first source-drain conductive layer 43.

In the display region AA, the display panel may further include a first electrode layer 45 arranged on a side of the second source-drain conductive layer 44 away from the base substrate 10, a light emitting material layer EL arranged on a side of the first electrode layer 45 away from the base substrate 10, and a second electrode layer 46 arranged on a side of the light emitting material layer EL away from the base substrate 10. The display panel may further include a second planarization layer PLN2 arranged between the second source-drain conductive layer 44 and the first electrode layer 45.

For example, the pixel unit may include a light emitting element such as an organic light emitting diode. The light emitting element includes an anode, a light emitting layer, and a cathode. The anode of the light emitting element may be located in the first electrode layer 45, the light emitting layer of the light emitting element may be located in the light emitting material layer EL, and the cathode of the light emitting element may be located in the second electrode layer 46. A conductive connection portion 47 for electrically connecting the thin film transistor with the light emitting element may be located in the second source-drain conductive layer 44.

For example, the display panel may further include a pixel defining layer PDL. The pixel defining layer PDL is located on a side of the first electrode layer 45 away from the base substrate 10, and is used to define an opening of each pixel unit.

For example, the semiconductor layer ACT may be formed of a semiconductor material such as low temperature polysilicon, and a film layer thickness of the semiconductor layer may be in a range of 400 to 800 angstroms, such as 500 angstroms. The first gate conductive layer 41 and the second gate conductive layer 42 may be formed of a conductive material that forms the gate of the thin film transistor. For example, the conductive material may be Mo, and a film layer thickness of the conductive material may be in a range of 2000 to 4000 angstroms, such as 3000 angstroms. The first source-drain conductive layer 43 and the second source-drain conductive layer 44 may be formed of conductive materials that form the source and drain of the thin film transistor. For example, the conductive material may contain Ti, Al, etc. The first source-drain conductive layer 43 may have a stack layer structure formed by Ti/Al/Ti with a film layer thickness in a range of 6000 to 9000 angstroms. For example, in the situation that the first source-drain conductive layer 43 or the second source-drain conductive layer 44 has a stack layer structure formed of Ti/Al/Ti, a thickness of each layer of Ti/Al/Ti may be respectively about 500 angstroms, about 6000 angstroms and about 500 angstroms. For example, the first insulating layer GI1 and the second insulating layer GI2 may be formed of silicon oxide, silicon nitride or silicon oxynitride, and each layer may have a thickness of about 1000 to 2000 angstroms. For example, the third insulating layer IDL1 and the passivation layer PVX may be formed of silicon oxide, silicon nitride or silicon oxynitride, with a thickness of about 3000 to 6000 angstroms.

The display panel may further include an encapsulation layer covering the light emitting element. The encapsulation layer may include a film layer alternately formed by inorganic and organic layers. For example, the encapsulation layer may include a first encapsulation sublayer 201, a second encapsulation sublayer 202 and a third encapsulation sublayer 203 arranged in sequence. For example, the first encapsulation sublayer 201 and the third encapsulation sublayer 203 may be composed of an inorganic material, and the second encapsulation sublayer 202 may be composed of an organic material. For example, the first encapsulation sublayer 201 and the third encapsulation sublayer 203 may be formed by a process such as chemical vapor deposition (i.e., CVD), and the second encapsulation sublayer 202 may be formed by a process such as ink jet printing (i.e., IJP).

In the embodiments of the present disclosure, the touch layer 30 is formed on a side of the second encapsulation sublayer 202 away from the base substrate 10. For example, the touch layer 30 may contain a conductive material for forming a touch electrode.

Optionally, the display panel may further include a light shielding layer 210. The light shielding layer 210 is arranged on a side of the active layer ACT close to the base substrate 10. An orthographic projection of the light shielding layer 210 on the base substrate 10 covers an orthographic projection of the active layer ACT on the base substrate 10, thereby avoiding an influence of external light on the active layer ACT. The display panel may further include a block layer or a buffer layer 220 arranged between the light shielding layer 210 and the active layer ACT. For example, the light shielding layer 210 may contain a metal opaque material.

Figure 4:
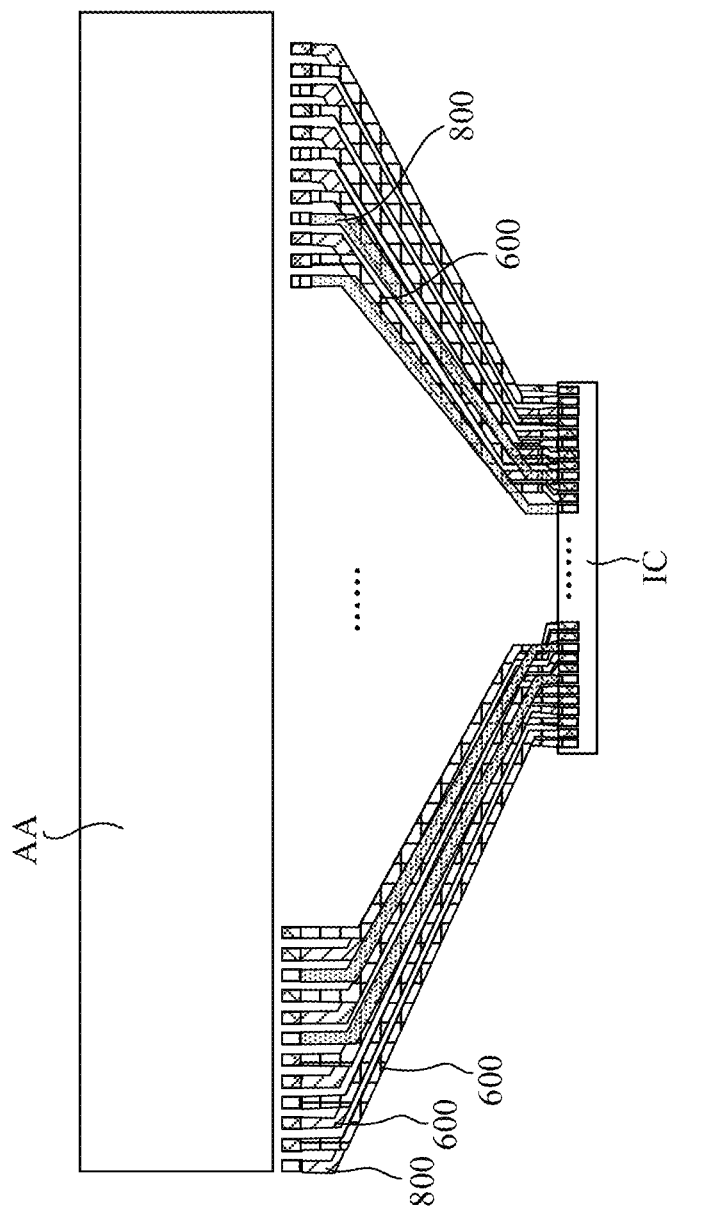
FIG. 4 is a partial enlarged view of a fan-out region of a display panel according to the embodiments of the present disclosure.
Figure 5A:
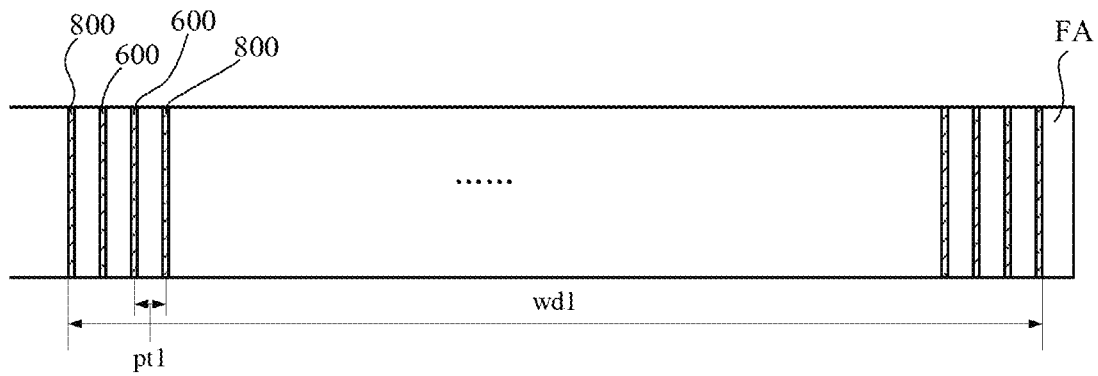
FIG. 5A to FIG. 5C are schematic diagrams of layouts of wires in each conductive layer of a fan-out region of a display panel according to the embodiments of the present disclosure, respectively.
Figure 5B:
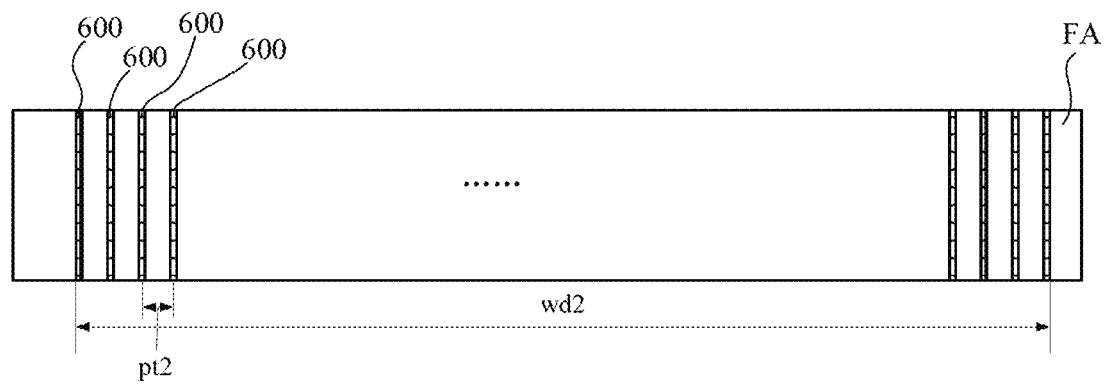
Figure 5C:
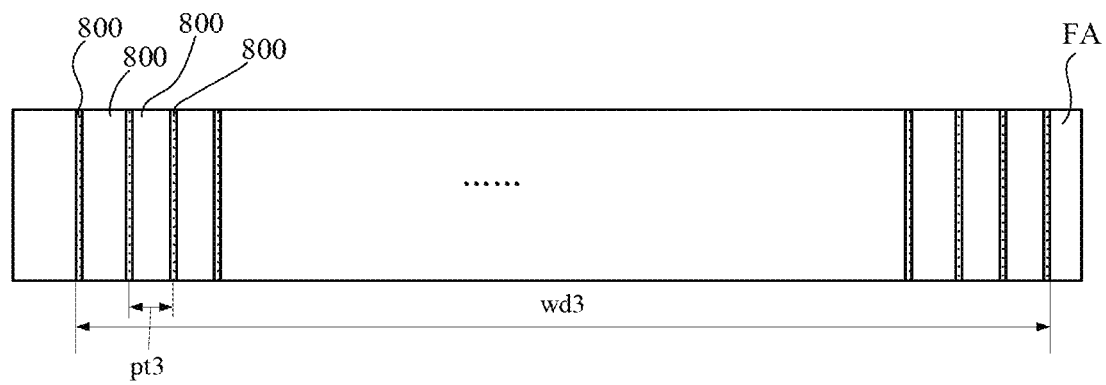
Figure 6:
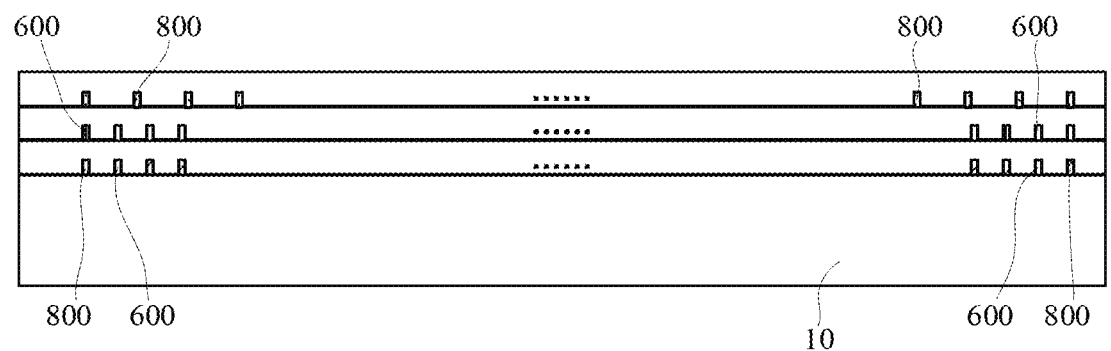
FIG. 6 is a schematic cross-sectional view of wires in each conductive layer of a fan-out region of a display panel according to the embodiments of the present disclosure.

FIG. 4 is a partial enlarged view of a fan-out region of a display panel according to the embodiments of the present disclosure. FIG. 5A to FIG. 5C are schematic diagrams of layouts of wires in each conductive layer of a fan-out region of a display panel according to the embodiments of the present disclosure, respectively. FIG. 6 is a schematic cross-sectional view of wires in each conductive layer of a fan-out region of a display panel according to the embodiments of the present disclosure.

Referring to FIG. 1 to FIG. 6, in the embodiments of the present disclosure, the display panel may include a first conductive layer, a second conductive layer and a third conductive layer arranged on the base substrate 10. A portion of the plurality of data wires 600 are located in the first conductive layer, and a rest portion of the plurality of data wires 600 are located in the second conductive layer. A portion of the plurality of touch wires 800 are located in at least one of the first conductive layer and the second conductive layer, and a rest portion of the plurality of touch wires 800 are located in the third conductive layer.

For example, the first conductive layer may be one of the first source-drain conductive layer 43 and the second source-drain conductive layer 44. The second conductive layer may be one of the touch layer 30 and the light shielding layer 210. The third conductive layer may be one of the first gate conductive layer 41 and the second gate conductive layer 42.

That is, in the embodiments of the present disclosure, in the fan-out region FA, the data wires 600 and the touch wires 800 are arranged in three layers. The data wires 600 are arranged in two layers, and the touch wires 800 are arranged in two or three layers. For example, a portion of the data wires 600 and a portion of the touch wires 800 are arranged in the first source-drain conductive layer 43 or the second source-drain conductive layer 44, a rest portion of the data wires 600 are arranged in the touch layer 30 or the light shielding layer 210, and a rest portion of the touch wires 800 are arranged in the first gate conductive layer 41 or the second gate conductive layer 42. Alternatively, a portion of the data wires 600 are arranged in the first source-drain conductive layer 43 or the second source-drain conductive layer 44, a portion of the touch wires 800 and a rest portion of the data wires 600 are arranged in the touch layer 30 or the light shielding layer 210, and a rest portion of the touch wires 800 are arranged in the first gate conductive layer 41 or the second gate conductive layer 42. Alternatively, a portion of the data wires 600 and a portion of the touch wires 800 are arranged in the first source-drain conductive layer 43 or the second source-drain conductive layer 44, a rest portion of the data wires 600 and another portion of the touch wires 800 are arranged in the touch layer 30 or the light shielding layer 210, and a rest portion of the touch wires 800 are arranged in the first gate conductive layer 41 or the second gate conductive layer 42.

Referring to FIG. 5A to FIG. 5C, a pitch between any two adjacent wires in the first conductive layer is a first wire pitch pt1, a pitch between any two adjacent wires in the second conductive layer is a second wire pitch pt2, and a pitch between any two adjacent wires in the third conductive layer is a third wire pitch pt3.

It should be noted that, in the embodiments of the present disclosure, a pitch between two adjacent wires may be a distance between centers of the two adjacent wires. For example, a line width of each of the two adjacent wires is wdx, a spacing distance between the two adjacent wires is spx, and therefore, the pitch ptx between the two adjacent wires may be equal to wdx+spx.

In the embodiments of the present disclosure, any one of the first wire pitch pt1 and the second wire pitch pt2 is smaller than the third wire pitch pt3. For example, the first wire pitch pt1 and the second wire pitch pt2 may be substantially equal.

For example, in the embodiments of the present disclosure, a dry etching process may be used to form the wires (including various wires located in the first conductive layer, such as the data wires and the touch wires) in the first conductive layer. In the dry etching process, a minimum wire pitch between the wires may be controlled to be about 4.2 microns. The dry etching process may be used to form the wires (including various wires located in the second conductive layer, such as the data wires and the touch wires) in the second conductive layer. In the dry etching process, a minimum wire pitch between the wires may be controlled to be about 4.2 microns. The wet etching process may be used to form the wires (including various wires located in the third conductive layer, such as the data wires and the touch wires) in the third conductive layer. In the wet etching process, a minimum wire pitch between the wires may be controlled to be about 5.5 microns.

It should be understood that the third conductive layer may be the gate conductive layer. In the process of manufacturing a display panel, in order to achieve a self-alignment process or a self-alignment region in the gate conductive layer, a wet etching process is generally used to form various conductive components such as a gate line, a gate and the like in the gate conductive layer.

That is, in the embodiments of the present disclosure, the first wire pitch pt1 and the second wire pitch pt2 may be about 4.2 microns, and the third wire pitch pt3 may be about 5.5 microns.

In the embodiments of the present disclosure, in the fan-out region, more wires are arranged in the two conductive layers having smaller wire pitches, fewer wires are arranged in the conductive layer having a larger wire pitch, and spaces occupied by each wire may be evenly provided in each conductive layer, so that a height of the fan-out region may be reduced, thereby the frame of the display panel may be reduced, which is conducive to achieving a display panel and a display device having a narrow frame.

In the embodiments of the present disclosure, in the fan-out region FA, a space occupied by a first wire spacing between various wires in the first conductive layer has a first width wd1, a space occupied by a second wire spacing between various wires in the second conductive layer has a second width wd2, and a space occupied by a third wire spacing between various wires in the third conductive layer has a third width wd3. A ratio between any two of the first width wd1, the second width wd2 and the third width wd3 is between 0.95 and 1.05. That is, any two of the first width wd1, the second width wd2 and the third width wd3 are substantially equal to each other.

For example, a quantity of the plurality of data wires 600 is m, and a quantity of the plurality of touch wires 800 is n. In the first conductive layer of the fan-out region, m1 data wires and n1 touch wires are arranged; in the second conductive layer of the fan-out region, m2 data wires and n2 touch wires are arranged; and in the third conductive layer of the fan-out region, n3 touch wires are arranged, wherein m=m1+m2, n=n1+n2+n3, and m1+n1=m2+n2, and wherein m, n, m1, m2, and n3 are all positive integers greater than or equal to 2, n1 and n2 are integers greater than or equal to 0, and n1 and n2 are not 0 at the same time.

For example, $(m1+n1) \times pt1 = (m2+n2) \times pt2$. That is, the first width wd1 is equal to the second width wd2.

For example, $$pr = \frac{(m1 + n1) \times pt1}{(n3 \times pt3)},$$

wherein pr represents a ratio of the first width to the third width, and pr is between 0.95 and 1.05. That is, the first width wd1 is substantially equal to the third width wd3.

Figure 7:
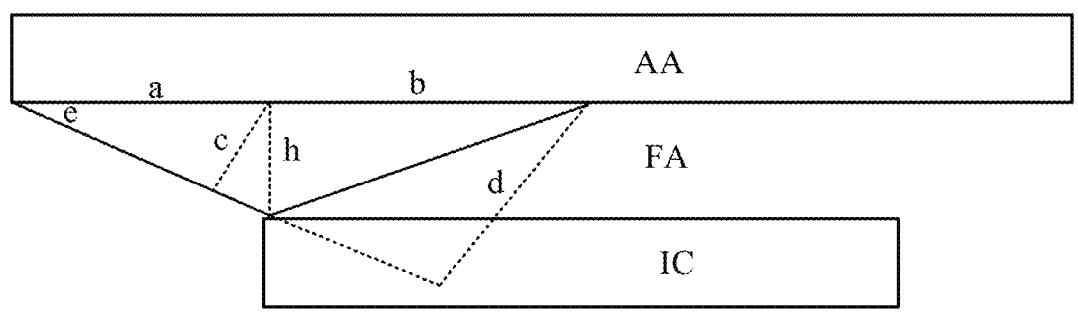
FIG. 7 is a schematic diagram of a fan-out region of a display panel according to the embodiments of the present disclosure, in which a relationship between a width of a space occupied by wires in the fan-out region and a height of the fan-out region is schematically shown.

FIG. 7 is a schematic diagram of a fan-out region of a display panel according to the embodiments of the present disclosure, in which a relationship between a width of a space occupied by wires in the fan-out region and a height of the fan-out region is schematically shown.

As shown in FIG. 7, a represents a half of a width of a protruding portion of the display region AA with respect to the chip IC, i.e., a is related to an arrangement position of the chip IC. b represents a half of a width of an overlapping portion of the display region AA with the chip IC. i.e., b is related to a width of the display region AA of the display panel. h represents a height of the fan-out region FA. e represents an inclination angle of the wires in the fan-out region. d represents a connection line between a middle position of the display region AA and a pin of the chip IC, and d is related to the quantity of wires and the wire pitch in the fan-out region. c is a height of an auxiliary line perpendicular to an edge wire.

According to the similar triangle principle, c/d=a/(a+b), and c=ad/(a+b) is obtained.

According to sin(e)=c/a, e=arcsin(d/(a+b)) is obtained.

According to tan(e)=h/a, h=a*tan(e) is obtained.

According to the above formulas, it may be seen that the height h of the fan-out region is related to a and e, and e is related to b and d. On a premise that a dimension of the display panel (determining b) and the position of the chip IC (determining a) are fixed, the height h of the fan-out region FA is only positively correlated with d. That is, the height h of the fan-out region FA is only positively correlated with the width of the space occupied by the wires in the fan-out region (i.e., the above-mentioned first width wd1, second width wd2, and third width wd3). In the embodiments of the present disclosure, by reasonably arranging the wires in the three conductive layers in the fan-out region, the width of the space occupied by the wires in the fan-out region may be reduced, thereby reducing the height of the fan-out region. In this way, the width of the lower frame where the fan-out region is located may be reduced, thereby facilitating the achievement of the display panel having a narrow frame.

In the embodiments of the present disclosure, referring to FIG. 4, a portion of the plurality of touch wires 800 located at edges of two sides of the fan-out region FA are located in least one of the first conductive layer and the second conductive layer. That is, the touch wires 800 arranged on the same layer as a portion of the data wires 600 are arranged at edge positions on two sides of the fan-out region FA.

Figure 8:
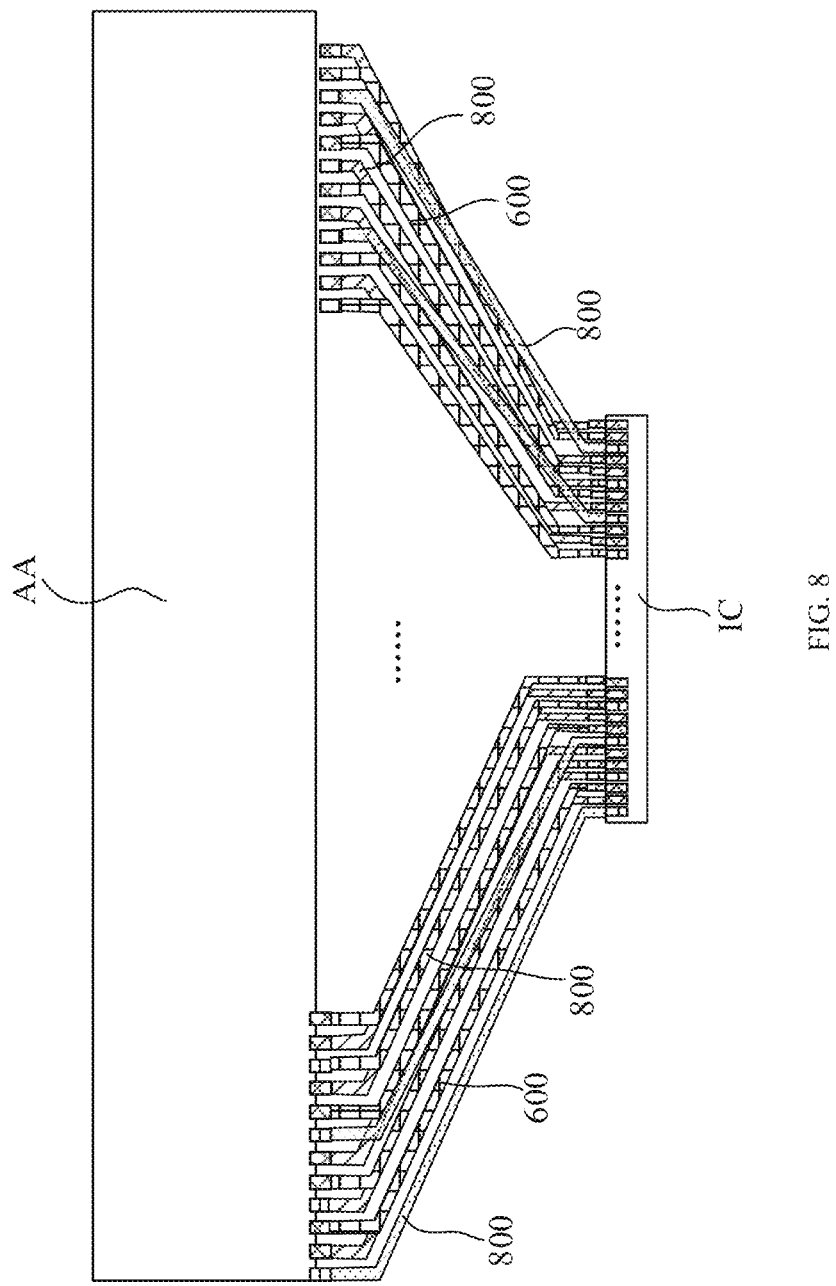
FIG. 8 is a partial enlarged view of a fan-out region of a display panel according to some other embodiments of the present disclosure.

FIG. 8 is a partial enlarged view of a fan-out region of a display panel according to some other embodiments of the present disclosure. Alternatively, referring to FIG. 8, in the embodiments of the present disclosure, for the plurality of touch wires 600, the touch wires 600 located at odd positions are located in at least one of the first conductive layer and the second conductive layer, or the touch wires 600 located at even positions are located in at least one of the first conductive layer and the second conductive layer. That is, the touch wires 800 arranged on the same layer as a portion of the data wires 600 are evenly arranged with the data wires 600 on the same layer.

Figure 9A:
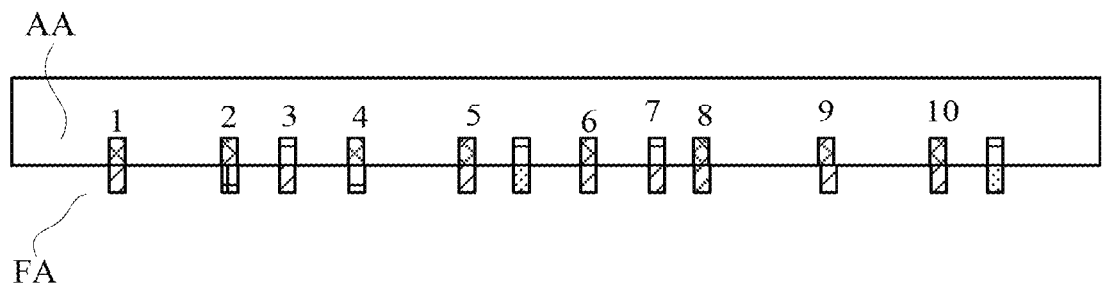
FIG. 9A to FIG. 9C schematically show different implementations of an arrangement of wires in a fan-out region of a display panel according to the embodiments of the present disclosure, respectively.
Figure 9B:
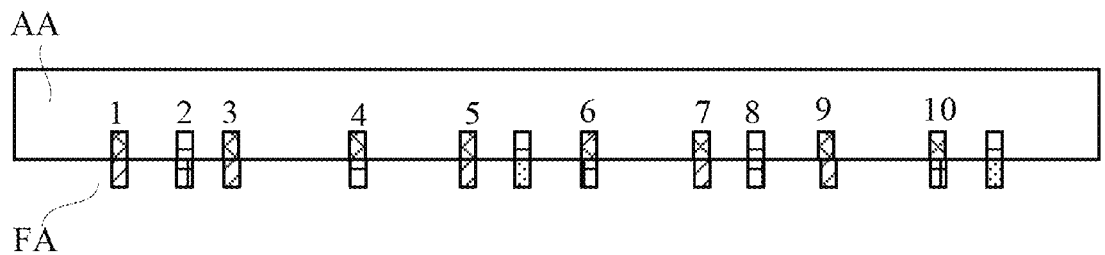
Figure 9C:
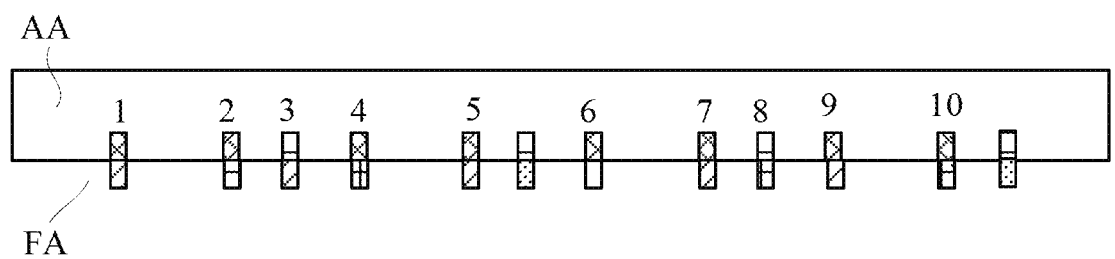

FIG. 9A to FIG. 9C schematically show different implementations of an arrangement of wires in a fan-out region of a display panel according to the embodiments of the present disclosure, respectively.

Referring to FIG. 9A, a portion of the data wires are located in the first conductive layer, a rest portion of the data wires are located in the second conductive layer, a portion of the touch wires are located in the first conductive layer, and a rest portion of the touch wires are located in the third conductive layer. That is, m1 data wires are located in the first conductive layer, m2 data wires are located in the second conductive layer, n1 touch wires are located in the first conductive layer, and n2=0. In the display region AA, the data lines DL and the touch signal lines TL are respectively electrically connected to the data wires 600 and the touch wires 800 in the fan-out region. For example, as shown in FIG. 9A, the data lines electrically connected to the m1 data wires, the touch signal lines electrically connected to the n1 touch wires, and the data lines electrically connected to the m2 data wires are numbered consecutively and respective numbers are used to indicate respective providing positions thereof. For example, the data lines electrically connected to the m1 data wires and the touch signal lines electrically connected to the n1 touch wires are all located at odd positions (1, 3, 5, 7, and 9 in FIG. 9A), and the data lines electrically connected to the m2 data wires are located at even positions (2, 4, 6, 8, and 10 in FIG. 9A).

Referring to FIG. 9B, a portion of the data wires are located in the first conductive layer, a rest of the data wires are located in the second conductive layer, a portion of the touch wires are located in the second conductive layer, and a rest of the touch wires are located in the third conductive layer. That is, m1 data wires are located in the first conductive layer, m2 data wires are located in the second conductive layer, n2 touch wires are located in the second conductive layer, and n1=0. In the display region AA, the data lines DL and the touch signal lines TL are respectively electrically connected to the data wires 600 and the touch wires 800 in the fan-out region. For example, as shown in FIG. 9B, the data lines electrically connected to the m1 data wire, the touch signal lines electrically connected to the n2 touch wires, and the data lines electrically connected to the m2 data wires are numbered consecutively and respective numbers are used to indicate respective providing positions thereof. For example, the data lines electrically connected to the m1 data wires are located at odd positions (1, 3, 5, 7, and 9 in FIG. 9B), the touch signal lines electrically connected to the n2 touch wires are located at even positions (2 and 8 in FIG. 9B), and the data lines electrically connected to the m2 data wires are located at even positions (4, 6 and 10 in FIG. 9B).

Referring to FIG. 9C, a portion of the data wires are located in the first conductive layer, a rest portion of the data wires are located in the second conductive layer, a portion of the touch wires are located in the first conductive layer, another portion of the touch wires are located in the second conductive layer, and a rest portion of the touch wires are located in the third conductive layer. That is, m1 data wires are located in the first conductive layer, m2 data wires are located in the second conductive layer, n1 touch wires are located in the second conductive layer, n2 touch wires are located in the second conductive layer, n3 touch wires are located in the third conductive layer, and m1, m2, n1, n2, and n3 are all positive integers greater than 0. In the display region AA, the data lines DL and the touch signal lines TL are respectively electrically connected to the data wires 600 and the touch wires 800 in the fan-out region. For example, as shown in FIG. 9C, the data lines electrically connected to the m1 data wires, the touch signal lines electrically connected to the n1 touch wires, the data lines electrically connected to the m2 data wires, and the touch signal lines electrically connected to the n2 touch wires are consecutively numbered, and respective numbers are used to indicate respective providing positions thereof. For example, the data lines electrically connected to the m1 data wires are located at odd positions (1, 5, 7, and 9 in FIG. 9C), the touch signal lines electrically connected to the n1 touch wires are located at odd positions (3 in FIG. 9C), the data lines electrically connected to the m2 data wires are located at even positions (2, 4, 6, and 10 in FIG. 9C), and the touch signal lines electrically connected to the n2 touch wires are located at even positions (8 in FIG. 9C). In the embodiments of the present disclosure, alternatively, the data lines electrically connected to the m1 data wires may be located at even positions, the touch signal lines electrically connected to the n1 touch wires may be located at even positions, the data lines electrically connected to the m2 data wires may be located at odd positions, and the touch signal lines electrically connected to the n2 touch wires may be located at odd positions.

Figure 10A:
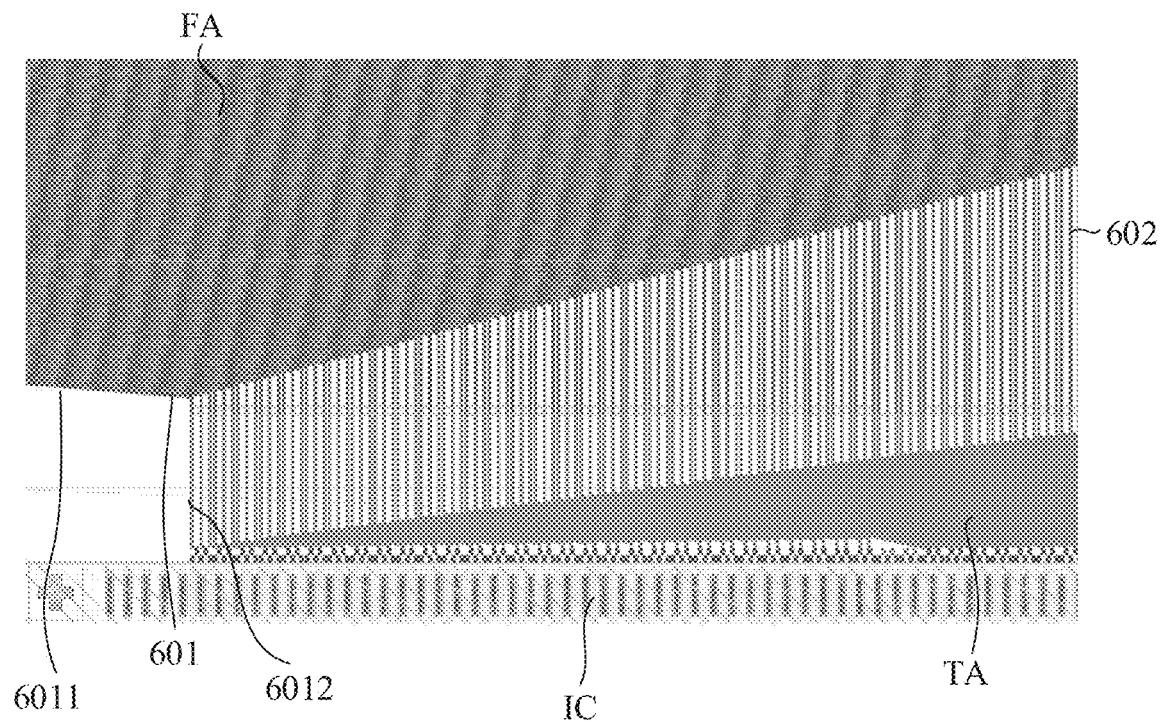
FIG. 10A and FIG. 10B are schematic diagrams of a jumper region in a display panel according to the embodiments of the present disclosure, respectively.
Figure 10B:
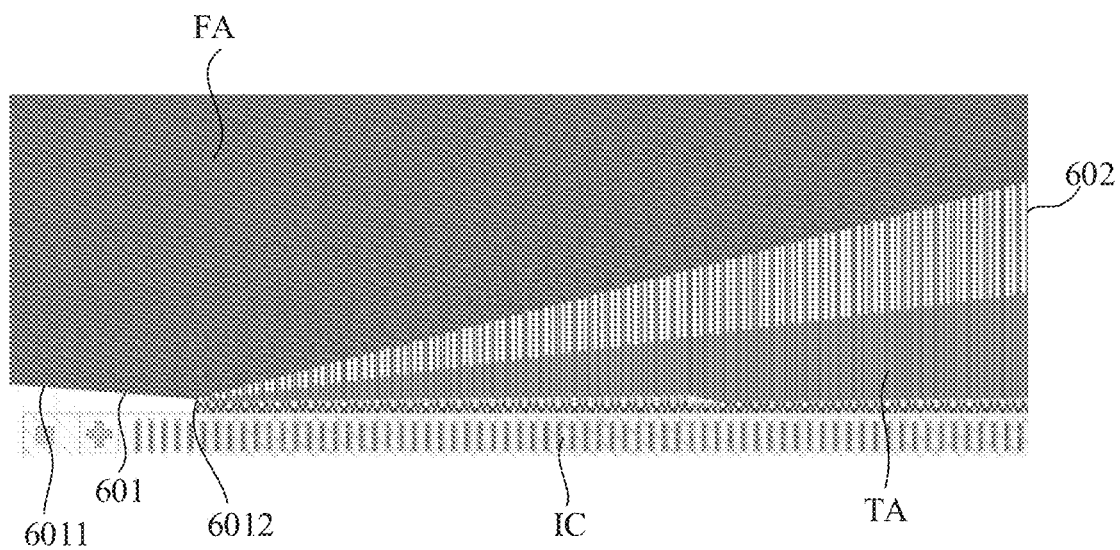

FIG. 10A and FIG. 10B are schematic diagrams of a jumper region in a display panel according to the embodiments of the present disclosure, respectively.

Referring to FIG. 1 to FIG. 10B, in the embodiments of the present disclosure, in the fan-out region FA, all the data wires and a portion of the touch wires are arranged in the first conductive layer and the second conductive layer. In this way, an arrangement rule of the data lines DL and the touch signal lines TL in the display region AA is different from an arrangement rule of data signal pins and touch signal pins on the chip IC for providing data signals and touch signals. In this situation, an additional jumper region TA needs to be added to connect the data lines DL and the touch signal line TL in the display region AA with corresponding pins, respectively. That is, in the embodiments of the present disclosure, the display panel further includes a plurality of jumpers, the fan-out region includes a jumper region TA, and the jumper region TA is located between the plurality of data wires as well as the plurality of touch wires and the chip IC. The plurality of jumpers are used to electrically connect the plurality of data wires as well as the plurality of touch wirings with the chip. For example, the plurality of jumpers may include a first jumper and a second jumper. The first jumper may be used to electrically connect the wires in the first conductive layer, and the second jumper may be used to electrically connect the wires in the second conductive layer.

Referring to FIG. 10A and FIG. 10B, the plurality of data wires or the plurality of touch wires include a first wire 601 located at a side edge of the fan-out region FA (a left region in the drawing) and a second wire 602 located at a middle position of the fan-out region FA (a right region in the drawing). The first wire 601 includes an inclined portion 6011 and a vertical portion 6012. The vertical portion 6012 extends parallel to the second direction Y, and the inclined portion 6011 extends obliquely with respect to the second direction Y. The second wire 602 only includes a vertical portion.

As shown in FIG. 10A, the inclined portion 6011 of the wire located in the fan-out region FA gradually becomes shorter from two sides of the chip IC to the middle position of the chip IC, and the vertical portion 6012 gradually becomes longer. The jumper region TA is located below the vertical portion 6012 of the wire. That is, in this embodiment, a jumper region TA is additionally added, which will result in an increase in the width of the lower frame of the display panel, which is not conducive to achieving a display panel having a narrow frame.

As shown in FIG. 10B, the vertical portion 6012 of the wire in the fan-out region is gradually pulled up from the two sides of the chip IC to the middle position of the chip IC. That is, relative to the embodiment in FIG. 10A, the vertical portion of the wire in the fan-out region is gradually shortened, so that the jumper region TA may occupy a space cleared by pulling up the vertical portion of the wire in the fan-out region. In this embodiment, the jumper region TA does not affect an overall height of the fan-out region, thereby ensuring that the width of the lower frame of the display panel does not increase.

For example, in the embodiment shown in FIG. 10B, a ratio of a length of the vertical portion of the second wire 602 (i.e., an entire second wire) to a length of the vertical portion 6012 of the first wire 601 is greater than 2.

For example, the jumper region FA is located between the vertical portion and the chip, so that the length of the vertical portion of the second wire 602 is less than 1 mm. For example, the length of the vertical portion 6012 of the first wire 601 is less than 0.5 num.

In the embodiments of the present disclosure, at least some of orthographic projections of various wires located in the first conductive layer on the base substrate, orthographic projections of various wires located in the second conductive layer on the base substrate, and orthographic projections of various wires located in the third conductive layer on the base substrate are arranged apart. For example, at least some unblocked regions exist among the orthographic projections of various wires located in the first conductive layer on the base substrate, the orthographic projections of various wires located in the second conductive layer on the base substrate, and the orthographic projections of various wires located in the third conductive layer on the base substrate. A width of the unblocked regions along the first direction X is more than 25% of the overall width of the fan-out region. In this way, when UV light (i.e., ultraviolet light) is used to cure a frame sealant of the display panel, it may ensure that the fan-out region has sufficient transmittance to the UV light, so as to avoid an abnormal curing of the frame sealant.

Figure 11:
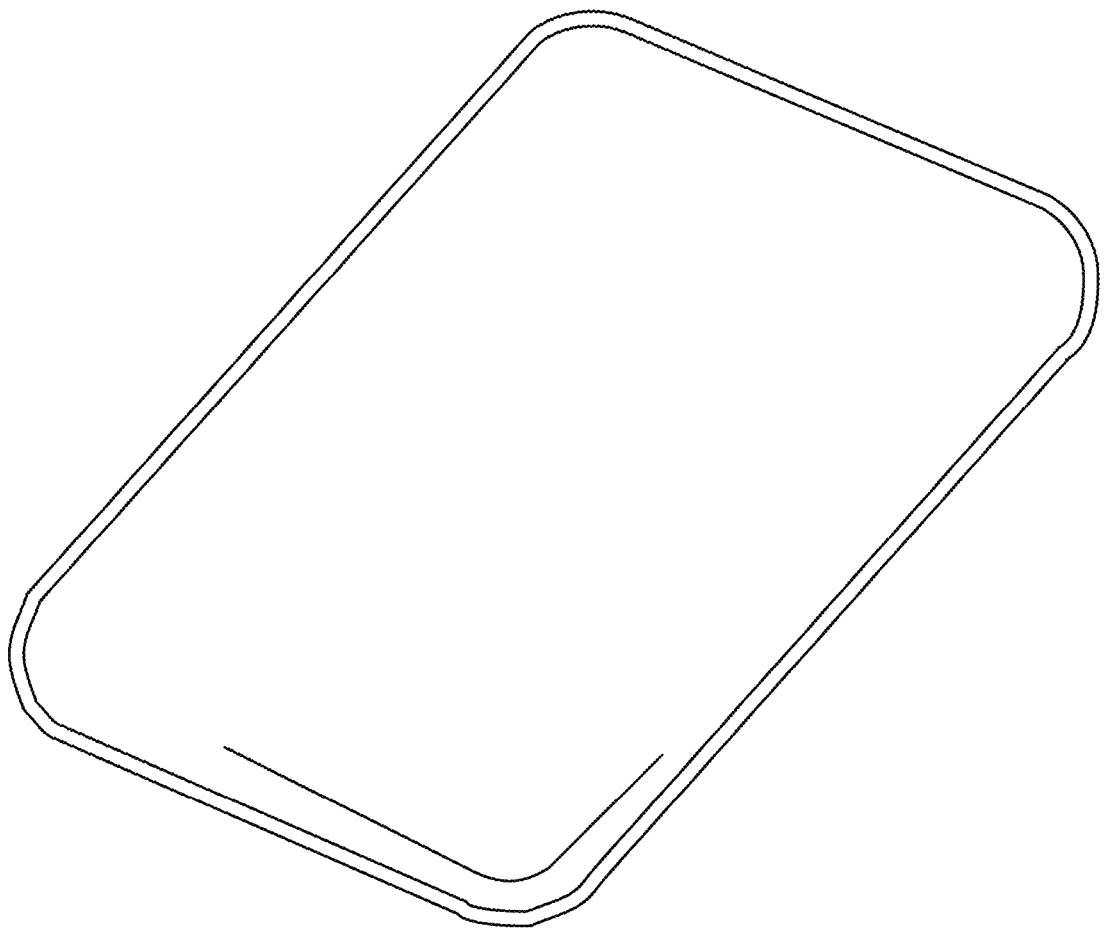
FIG. 11 is a schematic diagram of a display device according to some exemplary embodiments of the present disclosure.

FIG. 11 is a schematic diagram of a display device according to some exemplary embodiments of the present disclosure. The display device 1000 includes the above display panel.

The display device may include any apparatus or product having a display function. For example, the display device may be a smartphone, a mobile phone, an e-book reader, a desktop computer (PC), a laptop PC, a netbook PC, a personal digital assistant (PDA), a portable multimedia player (PMP), a digital audio player, a mobile medical device, a camera, a wearable device (such as a head-mounted device, an electronic clothing, an electronic wristband, an electronic necklace, an electronic accessory, an electronic tattoo, or a smart watch), a TV set, etc.

It should be understood that a display device according to the embodiments of the present disclosure has all the features and advantages of the above display panel. Please refer to the above description for details.

Although some embodiments of the general technical concept of the present disclosure have been shown and described, those of ordinary skill in the art will understand that modifications may be made to these embodiments without departing from the principles and spirits of the general technical concept, and the scope of the present disclosure is defined by the claims and the equivalents thereof.

What is claimed is:

1. A display panel, comprising:
a base substrate comprising a display region and a first side region, wherein the first side region is located on a first side of the display region, and the first side region comprises a fan-out region;
a plurality of pixel units, wherein at least some of the plurality of pixel units are arranged in the display region of the base substrate in an array along a first direction and a second direction intersecting the first direction;
a plurality of touch units, wherein at least some of the plurality of touch units are arranged in the display region of the base substrate in an array along the first direction and the second direction;
a plurality of data lines, wherein at least a portion of the data lines is located in the display region, and the plurality of data lines are respectively electrically connected with the plurality of pixel units for providing a data signal to each pixel unit;
a plurality of touch signal lines, wherein at least a portion of the touch signal lines is located in the display region, the plurality of touch signal lines are respectively electrically connected with the plurality of touch units for providing a touch signal to each touch unit;
a chip located in the first side region, wherein the fan-out region is located between the display region and the chip;
a plurality of data wires located in the fan-out region, wherein the plurality of data wires electrically connect the plurality of data lines with the chip, respectively;
a plurality of touch wires located in the fan-out region, wherein the plurality of touch wires electrically connect the plurality of touch signal lines with the chip, respectively,
wherein the display panel comprises a first conductive layer, a second conductive layer and a third conductive layer arranged on the base substrate,
wherein a portion of the plurality of data wires is located in the first conductive layer, and a rest portion of the plurality of data wires is located in the second conductive layer,
a portion of the plurality of touch wires is located in at least one of the first conductive layer and the second conductive layer, and a rest portion of the plurality of touch wires is located in the third conductive layer, and
wherein a pitch between any two adjacent wires in the first conductive layer is a first wire pitch, a pitch between any two adjacent wires in the second conductive layer is a second wire pitch, a pitch between any two adjacent wires in the third conductive layer is a third wire pitch, and any one of the first wire pitch and the second wire pitch is smaller than the third wire pitch.

2. The display panel according to claim 1, wherein in the fan-out region, a space occupied by a first wire spacing between the wires in the first conductive layer has a first width, a space occupied by a second wire spacing between the wires in the second conductive layer has a second width, and a space occupied by a third wire spacing between the wires in the third conductive layer has a third width; and wherein a ratio between any two of the first width, the second width and the third width is between 0.95 and 1.05.

3. The display panel according to claim 2, wherein a quantity of the plurality of data wires is m, and a quantity of the plurality of touch wires is n;
m1 data wires and n1 touch wires are provided in the first conductive layer of the fan-out region;
m2 data wires and n2 touch wires are provided in the second conductive layer of the fan-out region; and
n3 touch wires are provided in the third conductive layer of the fan-out region, and
wherein m=m1+m2, n=n1+n2+n3; and m1+n1=m2+n2, wherein m, n, m1, m2, and n3 are all positive integers greater than or equal to 2, n1 and n2 are integers greater than or equal to 0, and n1 and n2 are not 0 at the same time.

4. The display panel according to claim 3, wherein (m1+n1)×pt1=(m2+n2)×pt2, wherein pt1 represents the first wire pitch, and pt2 represents the second wire pitch.

5. The display panel according to claim 4, wherein $$pr = \frac{(m1 + n1) \times pt1}{(n3 \times pt3)},$$

pr represents a ratio of the first width to the third width, and pr is between 0.95 and 1.05.

6. The display panel according to claim 1, wherein the pixel unit comprises a pixel driving circuit, the pixel driving circuit comprises a thin film transistor, the thin film transistor comprises an active layer, a gate, a source and a drain, the gate is located in the third conductive layer, and the source and the drain are located in the first conductive layer.

7. The display panel according to claim 6, wherein the touch unit comprises a touch electrode, and the touch electrode is located in the second conductive layer.

8. The display panel according to claim 6, wherein the display panel comprises a light shielding portion located between the base substrate and the active layer, and an orthographic projection of the light shielding portion on the base substrate at least partially overlaps with an orthographic projection of the active layer on the base substrate; and
wherein the light shielding portion is located in the second conductive layer.

9. The display panel according to claim 7, wherein a portion of the plurality of touch wires located at edges of two sides of the fan-out region is located in at least one of the first conductive layer and the second conductive layer; or
for the plurality of touch wires, touch wires located at odd positions are located in at least one of the first conductive layer and the second conductive layer, or touch wires located at even positions are located in at least one of the first conductive layer and the second conductive layer.

10. The display panel according to claim 3, wherein m1 data wires are located in the first conductive layer, m2 data wires are located in the second conductive layer, n1 touch wires are located in the first conductive layer, and n2=0,
wherein data lines electrically connected with the m1 data wires and touch signal lines electrically connected with the n1 touch wires are all located at odd positions; and
wherein data lines electrically connected with the m2 data wires are located at even positions.

11. The display panel according to claim 3, wherein m1 data wires are located in the first conductive layer, m2 data wires are located in the second conductive layer, n2 touch wires are located in the second conductive layer, and n1=0,
  wherein data lines electrically connected with the m1 data wires are located at odd positions, and touch signal lines electrically connected with the n2 touch wires are located at even positions; and
  wherein data lines electrically connected with the m2 data wires are located at even positions.

12. The display panel according claim 3, wherein m1 data wires are located in the first conductive layer, m2 data wires are located in the second conductive layer, n1 touch wires are located in the second conductive layer, n2 touch wires are located in the second conductive layer, and n1 and n2 are both positive integers, and
  wherein data lines electrically connected with the m1 data wires are located at odd positions, touch signal lines electrically connected with the n1 touch wires are located at odd positions, data lines electrically connected with the m2 data wires are located at even positions, touch signal lines electrically connected with the n2 touch wires are located at even positions; or data lines electrically connected with the m1 data wires are located at even positions, touch signal lines electrically connected with the n1 touch wires are located at even positions, data lines electrically connected with the m2 data wires are located at odd positions, and touch signal lines electrically connected with the n2 touch wires are located at odd positions.

13. The display panel according to claim 1, wherein the plurality of data wires or the plurality of touch wires comprise a first wire located at a side edge of the fan-out region a second wire located at a middle position of the fan-out region, the first wire comprises an inclined portion and a vertical portion, the vertical portion extends parallel to the second direction, the inclined portion extends obliquely relative to the second direction, and the second wire only comprises a vertical portion, and
  wherein a ratio of the vertical portion of the second wire to the vertical portion of the first wire is greater than 2.

14. The display panel according to claim 13, wherein the display panel further comprises a plurality of jumpers, the fan-out region comprises a jumper region, the jumper region is located between the plurality of data wires as well as the plurality of touch wires and the chip, and the plurality of jumpers are configured to electrically connect the plurality of data wires as well as the plurality of touch wires with the chip, and
  wherein the jumper region is located between the vertical portion and the chip, so that a length of the vertical portion of the second wire is less than 1 mm.

15. The display panel according to claim 1, wherein at least some of orthographic projections of the wires located in the first conductive layer on the base substrate, orthographic projections of the wires located in the second conductive layer on the base substrate, and orthographic projections of the wires located in the third conductive layer on the base substrate are arranged apart.

16. A display device, comprising the display panel according to claim 1.

* * * * *